United States Patent [19]

Wu et al.

[11] Patent Number: 5,983,177
[45] Date of Patent: Nov. 9, 1999

[54] METHOD AND APPARATUS FOR OBTAINING TRANSCRIPTIONS FROM MULTIPLE TRAINING UTTERANCES

[75] Inventors: Jianxiong Wu, Verdun; Peter Stubley, Lachine; Vishwa Gupta, Brossard, all of Canada; Jean-Guy Dahan, Brookline, Mass.

[73] Assignee: Nortel Networks Corporation, Montreal, Canada

[21] Appl. No.: 08/994,007

[22] Filed: Dec. 18, 1997

[51] Int. Cl.⁶ .................................................. G10L 5/06
[52] U.S. Cl. .................. 704/244; 704/255; 704/252; 704/243
[58] Field of Search .................................. 704/252, 245, 704/256, 244, 251, 243, 237, 255, 249

[56] References Cited

U.S. PATENT DOCUMENTS

| | | | |
|---|---|---|---|
| 4,164,025 | 8/1979 | Dubnowski et al. | 364/900 |
| 4,454,586 | 6/1984 | Pirz et al. | 364/513.5 |
| 4,751,737 | 6/1988 | Gerson et al. | 381/43 |
| 4,783,803 | 11/1988 | Baker et al. | 704/252 |
| 4,797,910 | 1/1989 | Daudelin | 379/67 |
| 4,837,831 | 6/1989 | Gillick et al. | 704/245 |
| 4,852,180 | 7/1989 | Levinson | 704/256 |
| 4,903,305 | 2/1990 | Gillick et al. | 704/245 |
| 4,959,855 | 9/1990 | Daudelin | 379/213 |
| 4,979,206 | 12/1990 | Padden et al. | 379/67 |
| 5,027,406 | 6/1991 | Roberts et al. | 704/244 |
| 5,050,215 | 9/1991 | Nishimura | 381/41 |
| 5,052,038 | 9/1991 | Shepard | 379/88 |
| 5,086,479 | 2/1992 | Takenaga et al. | 382/14 |
| 5,091,947 | 2/1992 | Ariyoshi et al. | 381/42 |
| 5,097,509 | 3/1992 | Lennig | 381/43 |
| 5,127,055 | 6/1992 | Larkey | 381/43 |
| 5,163,083 | 11/1992 | Dowden et al. | 379/88 |
| 5,181,237 | 1/1993 | Dowden et al. | 379/88 |
| 5,204,894 | 4/1993 | Darden | 379/88 |
| 5,233,681 | 8/1993 | Bahl et al. | 704/251 |
| 5,274,695 | 12/1993 | Green | 379/88 |
| 5,307,444 | 4/1994 | Tsuboka | 395/22 |
| 5,329,608 | 7/1994 | Bocchieri et al. | 704/243 |
| 5,349,645 | 9/1994 | Zhao | 704/243 |
| 5,428,707 | 6/1995 | Gould et al. | 704/237 |
| 5,488,652 | 1/1996 | Bielby et al. | 379/88 |
| 5,502,791 | 3/1996 | Nishimura et al. | 704/256 |
| 5,526,463 | 6/1996 | Gillick et al. | 704/251 |
| 5,579,436 | 11/1996 | Chou et al. | 704/244 |
| 5,797,122 | 8/1998 | Spies | 704/255 |
| 5,799,276 | 8/1998 | Komissarchik et al. | 704/251 |

OTHER PUBLICATIONS

R. Haeb–Umbach et al., ("Automatic Transcription of unknown words in a Speech Recognition System", Proceedings of ICASSP'95, May 1995, pp. 840–843).

Automatic Modeling for Adding New Words to a Large Vocabulary Continuous Speech Recognition System, A. Asadi et al., Proc. of ICASSP'91, 1991, pp. 305–308.

Automatic Transcription of Unknown Words in a Speech Recognition System, R. Haeb–Umbach et al., Proc. of ICASSP'95, 1995, pp. 840–843.

Creating Speaker–Specific Phonetic Templates with a Speaker–Independent Phonetic Recognizer: Implications for Voice Dialing, N. Nail et al., Proc ICASSP'96, 1996, pp. 881–884.

(List continued on next page.)

*Primary Examiner*—David R. Hudspeth
*Assistant Examiner*—Vijay B. Chawan

[57] ABSTRACT

The invention relates to a method and an apparatus for adding a new entry to a speech recognition dictionary, more particularly to a system and method for generating transcriptions from multiple utterances of a given word. The novel method and apparatus automatically transcribes several training utterances into transcriptions without knowledge of the orthography of the word being added. It also provides a method and apparatus for transcribing multiple utterances into a single transcription that can be added to a speech recognition dictionary. In a first step, each utterance is analyzed individually to get their respective acoustic characteristics. Following this, these characteristics are combined to generate a set of the most likely transcriptions using the acoustic information obtained from each of the training utterances.

42 Claims, 9 Drawing Sheets

OTHER PUBLICATIONS

Fast Search Strategy in a Large Vocabulary Word Recognizer, V.N. Gupta et al., JASA 84(6), Dec. 1988, pp. 2007–2017.

Discriminative Training of the Pronunciation Networks, F. Korkmazskiy et al., IEEE 1997, Apr. 1997, pp. 223–229.

Automatic Rule–Based Generation of Work Pronunciation Networks, Nick Cremelie et al., ISSN 1018–4074, 1997, pp. 2459–2462.

Unleashing the Potential Human–to–Machine Communication, M. Lennig, Telesis, Issue 97, 1993, pp. 23–27.

An Introduction to Hidden Markov Models, Rabiner et al., IEEE ASSP Magazine, Jan. 1986, pp. 4–16.

Putting Speech Recognition to Work in the Telephone Network, Lennig, Computer, IEEE Computer Society, vol. 23, No, 8, Aug. 1990.

Dynamic Adaptation of Hidden Markov Model for Robust Speech Recognition, IBM Technical Disclosure Bulletin, vol. 27, No. 7A, Dec. 1984.

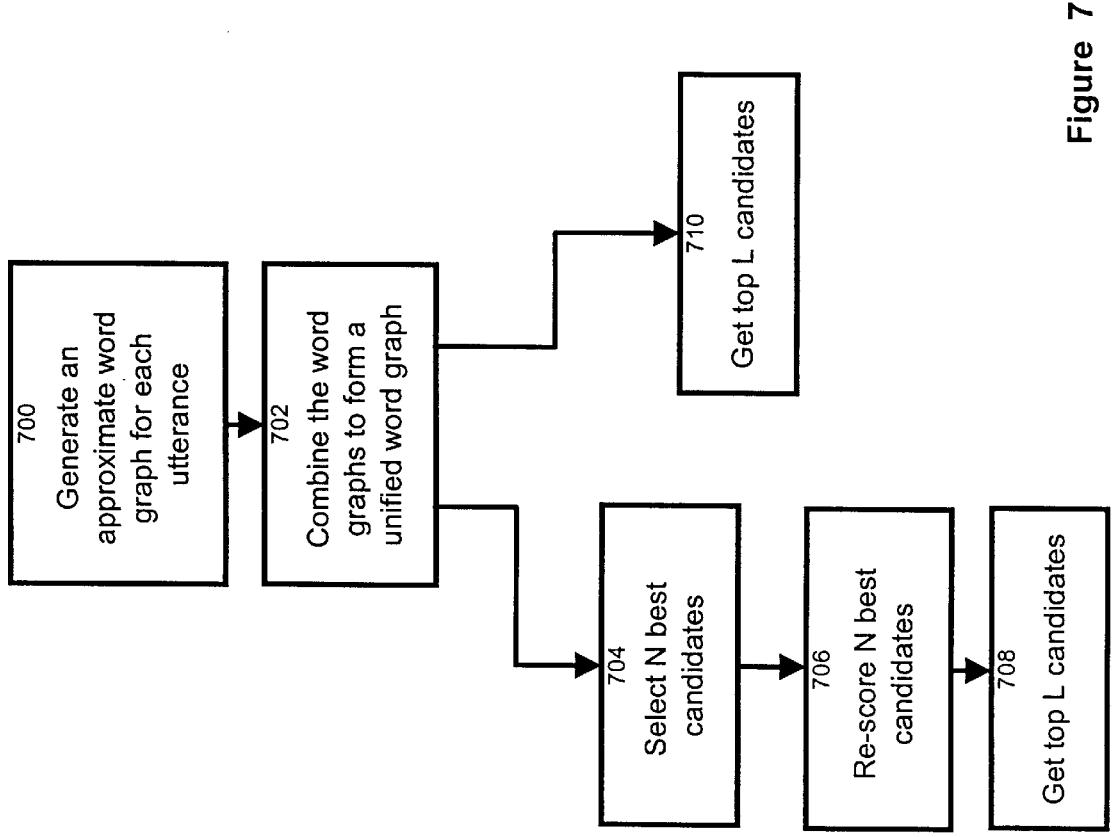

5,983,177

METHOD AND APPARATUS FOR OBTAINING TRANSCRIPTIONS FROM MULTIPLE TRAINING UTTERANCES

FIELD OF THE INVENTION

This invention relates to a method and an apparatus for automatically performing desired actions in response to spoken requests. It is particularly applicable to a method and all apparatus for automatically providing desired information in response to spoken requests, as may be used to partially or fully automate telephone directory assistance functions, voice activated dialing (VAD), credit card number identification and other speech recognition enabled services.

BACKGROUND OF THE INVENTION

In addition to providing printed telephone directories, telephone companies provide information services to their subscribers. The services may include stock quotes, directory assistance and many others. In most of these applications, when the information requested can be expressed as a number or number sequence, the user is required to enter his request via a touch tone telephone. This is often aggravating for the user since he is usually obliged to make repetitive entries in order to obtain a single answer. This situation becomes even more difficult when the input information is a word or phrase. In these situations, the involvement of a human operator may be required to complete the desired task.

Because telephone companies are likely to handle a very large number of calls per year, the associated labour costs are very significant. Consequently, telephone companies and telephone equipment manufacturers have devoted considerable efforts to the development of systems that reduce the labour costs associated with providing information services on the telephone network. These efforts comprise the development of sophisticated speech processing and recognition systems that can be used in the context of telephone networks.

In typical speech recognition systems, the user enters his request using isolated word, connected word or continuous speech via a microphone or telephone set. The request may be a name, a city or any other type of information for which either a function is to be performed or information is to be supplied. If valid speech is detected, the speech recognition layer of the system is invoked in an attempt to recognize the unknown utterance. Typically entries in a speech recognition dictionary are scored in order to determine the most likely match to the utterance.

In many speech applications, users may want to augment the vocabulary of the speech recognition dictionary by simply providing sample utterances of a new word. For example, the user of a voice activated dialing system may wish to add a new name and associated telephone number to his directory. In order to achieve this, the user repeats the name he wishes to add several times (typically 2 or 3 times) followed by the telephone number to be associated with the name. Based on these sample training utterances a new entry is created in the speech recognition dictionary and used for recognition purposes at a later time.

In many speech applications, particularly in telephone speech recognition applications such as voice activated dialing (VAD), it may be impossible or impractical to obtain the correct orthography for the new word from the user that he wishes to add to the dictionary. However, most approaches present in the prior art to augment a speech recognition dictionary require knowledge of the orthography of the new word to be added. For example, this is used in A. Asadi et al. "Automatic Modeling For Adding New Words To A Large Vocabulary Continuous Speech Recognition System", Proc. Of ICASSP'91, pp.305–308, 1991. The content of this document is incorporated herein by reference. Since the orthography cannot easily be obtained in telephone applications, these methods are not practical.

A common approach in generating the transcription for a new word is to obtain from the user a series of training utterances of the same word and decode each of the utterances separately. This approach generates a series of separate alternative acoustic sub-word representations each representation corresponding to different pronunciations of the same word. All these transcriptions are then stored in a speech recognition dictionary. Mathematically, this operation can be expressed as follows:

$$T_i = \arg\max_{t \in T} P(t|Y_i) \quad i = 1, \ldots, p \qquad \text{Equation 1}$$

where $T_i$ is the transcription of the ith utterance, p is the number of training utterances, $\{Y_1, Y_2, Y_3, \ldots Y_p\}$ are the training utterances, T is the set of all possible transcriptions for any word and P(|) designates a conditional probability computation. A problem with this approach is that the computational coat of the recognition stage is very high since, for each word, the speech recognition system must score multiple entries in the dictionary, For a more detailed explanation, the reader is invited to consult R. Haeb-Umbach et al. "Automatic Transcription Of Unknown Words In A Speech Recognition System", Proc. Of ICASSP'95, pp.840–843, 1995 and N. Jain et al. "Creating Speaker-Specific Phonetic Templates With A Speaker-Independent Phonetic Recognizer: Implications For Voice Dialing", Proc. ICASSP'96, pp.881–884, 1996. The content of these documents is hereby incorporated by reference.

Another approach is to take the series of separate alternative transcriptions of the new word, generated as described in equation 1, and then select a single transcription which best represents all the utterances. Essentially, a transcription $T_{best}$ is chosen which is the most likely to have produced all utterances $\{Y_1, Y_2, Y_3, \ldots Y_p\}$. Mathematically, this operation can be expressed as follows:

$$T_{best} = \arg\max_{t \in \{T_1, T_2, \ldots T_p\}} \left( \prod_{i=1}^{p} P(Y_i|t) \right) \qquad \text{Equation 2}$$

For a more detailed explanation, the reader is invited to consult R. Haeb-Umbach et al. "Automatic Transcription Of Unknown Words In A Speech Recognition System", Proc. Of ICASSP'95, pp.840–843, 1995 whose content is incorporated by reference Choosing a single transcription for the new word reduces the memory space required for the dictionary and reduces the amount of time necessary to score the dictionary. However, the selected transcription merely reflects the acoustic information in the utterance that originated the transcription, and disregards the acoustic information of the utterances associated with the transcriptions that where rejected during the selection process. Thus, there exists a need in the industry to refine the process of adding a new word to a speech recognition dictionary such as to obtain a more accurate representation for new entries and to reduce the computational costs at the recognition stage.

OBJECTS AND STATEMENT OF THE INVENTION

An object of the invention is to provide a method and apparatus that can be used for adding a new entry in a speech recognition dictionary.

A further object of the invention is a computer readable storage medium containing a program element that instructs a computer to process a set of utterances to generate an entry in a speech recognition dictionary.

As embodied and broadly described herein the invention provides an apparatus for creating an entry associated with a certain word in a speech recognition dictionary, said apparatus comprising:

an input for receiving audio information representative of at least two utterances of the certain word;

processing means for processing said audio information to provide a transcription of the certain word, said transcription being characterised by at least one acoustic sub-word unit, said transcription being representative of acoustic information contained in each one of said two utterances;

means for creating an entry in the speech recognition dictionary on a basis of said transcription.

For the purpose of this specification the expressions "orthography" is a data element that can be mapped onto a spoken utterance that can form a single word or a combination of words. Typically, entries in a speech recognition dictionary are "orthographies" and they are expressed in the dictionary on a basis of written symbols or characters that are components of an alphabet.

For the purpose of this specification the expression "utterance" is used to describe a representation of a sound or combination of sounds that forms a meaningful linguistic unit.

For the purpose of this specification the expression "transcription" is used to designate the acoustic representation of word as a sequence of sub-word units. A number of acoustic sub-word units can be used in a transcription such as phonemes, triphones, syllables and dyads (demi-syllables). Commonly, the phoneme is used as the sub-word unit and the representation is designated as "phonemic transcription".

For the purpose of this specification the expression "allophone" is used to designate a phoneme placed in a certain context defined by the surrounding phones.

In the most preferred embodiment of this invention, the apparatus for adding a new entry to a speech recognition dictionary is used in a speech recognition systems that provide voice-activated dialing functions. From a functional point of view, a voice-activated dialing system attempts to connect a user via the telephone network to another individual on the basis of voice-only commands. Typically, the voice-activated dialing system is integrated into the telephone network such that subscribers are immediately connected to the system upon occurrence of an off-hook condition. In the preferred embodiment, the voice activated dialing system provides three main functions, all of which are accessed via voice commands. First, programmable subscriber-dependent directories allow telephone numbers to be associated with keywords. Subscribers set up the association between a telephone number and a voice label in a training session. Typically two or more utterances are used to define a voice label. Second, a telephone connection can be made to a telephone number in the programmed directory via the utterance of its associated keywords. Finally, a mechanism exists to access numbers outside of the programmable subscriber-dependent directory, either by saying the number to be called, or by a fallback to the conventional dialing system. Such voice-activated systems are particularly useful to individuals using telephones in their automobiles, or other hands-busy, eyes-busy environments.

Once the voice-activated dialing system receives a request from the user to add a new entry to the directory, the system will first issue a prompt over the telephone network requesting the user to specify the new entry. If valid speech is detected in response to this prompt, a speech recognition layer is invoked that selects from a speech recognition dictionary an entry that is most likely to match the spoken utterance. If such an entry is found in the speech recognition dictionary, the system returns an error message specifying that there already exists an entry in the dictionary with the same label. If no entry in the speech recognition dictionary matches the utterance, the system issues a second prompt over the telephone network requesting the user to specify the new entry a second time. Again, if valid speech is detected in response to this prompt, a speech recognition layer is invoked in order to determine if the new entry already exists in the speech recognition dictionary. If there isn't, the system performs a consistency check in order to determine of the utterances are sufficiently similar to one another to define a unique entry. In the affirmative, the process for addition of the new entry is initiated.

As a first step, each training utterance is converted into a sequence of feature vectors or other suitable representation. Following this, a decoding algorithm using the maximum likelihood criterion is applied on each training utterance separately. For each training utterance, the N best transcription candidates are determined based on probability computations. These N best transcription candidates form a sub-set of the set of all possible transcriptions. The various transcription candidates in the sub-set vary from one another on the basis of the acoustic sub-word units (phonemes in this example) that make-up each candidate.

For example, if there are p utterances, then p×N candidate transcriptions are generated which are grouped as p individual sub-sets of N candidates each. The p sub-sets are compared and the transcriptions that are common among the sub-sets are selected to form a combined list of size M. Preferably M is a non-zero integer equal or greater than one (1). If no candidate transcription satisfies this criteria, namely if no common transcription can be found among the sets, the size of the sub-sets is increased. As a final step, this combined candidate transcription list is resorted according to its candidate probability likelihood scores and the top L candidate transcriptions are entered in the speech recognition dictionary. For example, if only one transcription is desired for each new word, L is set to one (1).

In this embodiment, the selected L transcriptions reflect the acoustic information from all the training utterances since the L transcriptions chosen are common to all the utterances.

In another embodiment, once the addition of a new word has been initiated, each training utterance is converted into a sequence of feature vectors or other suitable representation. Following this, a forward searching step is performed on each training utterance separately. Preferably the Viterbi search algorithm or the Level-Building search algorithm is used to perform the forward search. These algorithms are well known in the art to which this invention pertains and do not need to be described here in detail. Other suitable algorithms may be used here without departing from the spirit of the invention. The optimum partial path for each utterance up to frame t of the search are stored along with their associated probability likelihood value. For example, the values $F_w(t, Y_i)$ representing the forward maximum probabilities generated by the Viterbi search algorithm, are stored for the partial path ending at frame $\angle$ with the phoneme label w for the training utterance $Y_i$. Essentially, the result of the forward search is a set of phonemic lattices, one for each of the training utterances. After the forward search has been performed on all the training utterances, a backward search is performed on all the lattices simultaneously to find the top candidates. The preferred embodiment uses a modified version of the A* search algorithm. The A* algorithm is well-known in the art to which this invention pertains. In order to take into account the results obtained from all the training utterances, when calculating the scores of each possible path, the probabilities of all the utterances are added into the computation. Once the backward search is completed, the top L scoring transcriptions are added into the speech recognition dictionary. For example, if only one transcription is desired for each new word, L is set to one (1).

Stated otherwise, once the phonemic lattices have been created, the backward search has the effect of merging the lattices together and then finding the best L transcriptions. As in the case of the previous embodiment, the selected L transcriptions are representative of acoustic information from all the training utterances.

In yet another embodiment, once the addition of a new word has been initiated, each training utterance is converted into a sequence of feature vectors or other suitable representation. An approximate word graph is first generated for each training utterance. The concept of a graph is well known in the art to which this invention pertains. For more information about the fast match search in connection with graphs, the reader is invited to consult V. N. Gupta et al. "Fast search strategy in a large vocabulary word recognizer", JASA 84(6), pp.2007–2017, December 1988 whose content is herein incorporated by reference. Preferably each branch in the graph corresponds to one sub-word unit such as a phoneme. Each word graph is scored and each branch is associated with a probability value. Preferably, word graphs for different utterances have the same structure but different branch scores since the same phoneme grammar is used for decoding different utterances. Following this, the graphs are combined and scores of corresponding branches are summed to form a unified graph. The unified graph is then processed to find the L best scores among all the branches ir the unified graph where L is the number of transcriptions desired for the new word. Finding the L best scores in a graph is well known in the art and for further information the reader is invited to consult V. N. Gupta et al. "Fast search strategy in a large vocabulary word recognizer", JASA 84(6), pp.2007–2017, December 1988 whose content is herein incorporated by reference. The transcriptions are then introduced into the speech recognition dictionary.

Here again, the L selected transcriptions are representative of acoustic information contained in all the training utterances.

Alternatively, after the unified graph is created, a detailed acoustic model re-scores the candidates in the N-best list. The L best scoring transcriptions are then selected and added to the speech recognition dictionary. For example, if only one transcription is desired for each new word, L is set to one (1).

As embodied and broadly described herein the invention provides a method for creating an entry associated with a certain word in a speech recognition dictionary, said method comprising the steps of:
  receiving audio information representative of at least two utterances of the certain word;
  processing said audio information to provide a transcription of the certain word, said transcription being characterized by at least one acoustic sub-word unit, said transcription being representative of acoustic information contained in each one of said two utterances;
  creating an entry in the speech recognition dictionary on a basis of said transcription.

As embodied and broadly described herein the invention provides a machine-readable storage medium containing a program element to direct a computer to create an entry associated with a certain word in a speech recognition dictionary, said program element implementing functional blocks, comprising:
  an input for receiving audio information representative ot at least two utterances of the certain word;
  processing means for processing said audio information to provide a transcription of the certain word, said transcription being characterised by at least one acoustic sub-word unit, said transcription being representative of acoustic information contained in each one of said two utterances;
  means for creating an entry in the speech recognition dictionary on a basis of said transcription.

BRIEF DESCRIPTION OF THE DRAWINGS

These and other features of the present invention will become apparent from the following detailed description considered in connection with the accompanying drawings. It is to be understood, however, that the drawings are provided for purposes of illustration only and not as a definition of the boundaries of the invention for which reference should be made to the appending claims.

FIG. 5b shows a flow chart of the process for effecting the backward portion of the forward-backward approach depicted in FIG. 5a;

FIG. 7 shows a flow chart of the fast-matching approach in accordance with an embodiment of the present invention.

DESCRIPTION OF A PREFERRED EMBODIMENT

In the most preferred embodiment of this invention, the apparatus to add a new entry to a speech recognition dictionary is used in a speech recognition system that provides voice-activated dialing functions. The purpose of the invention is to allow a user to add new words to the speech recognition dictionary such as to improve the performance of the system.

Figure 1:
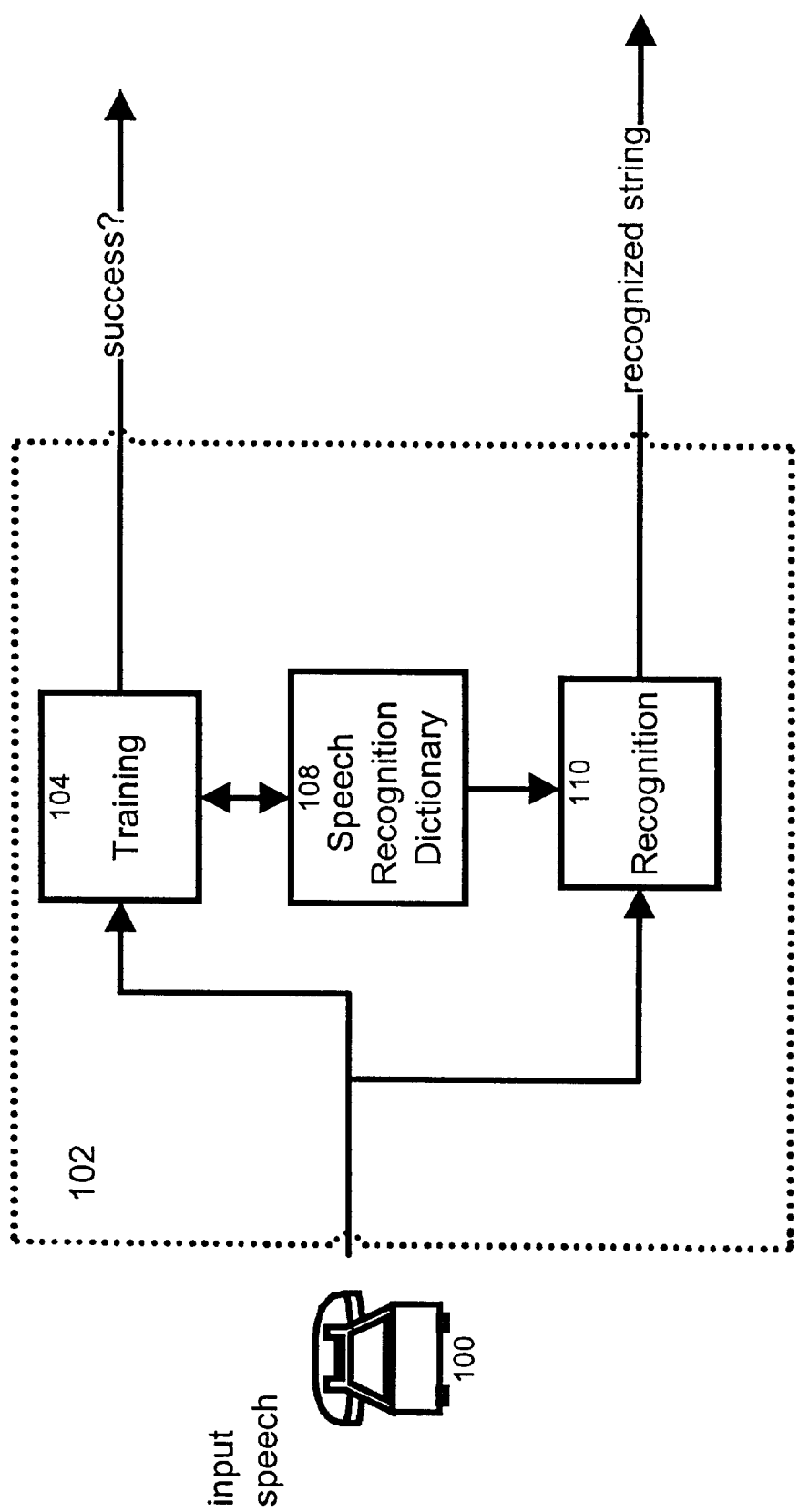
FIG. 1 shows a simplified functional block diagram of a speech recognition system.

From a functional point of view, a voice-activated dialing system attempts to connect a user via the telephone network to another individual on the basis of voice-only commands. Typically, the voice-activated dialing system is integrated into the telephone network such that subscribers are immediately connected to the system when the telephone is off-hook. A typical system, of the type depicted in FIG. 1, generally comprises a device such as a microphone or telephone set 100 to convert the spoken utterance into an electric signal and transmit the signal to a speech processing unit 102. The speech-processing unit 102 can be split into two functional blocks namely a recognition unit 110 and a training unit 104 These two units 110 104 make use of a speech recognition dictionary 108 that stores a set of entries potentially recognisable on the basis of a spoken utterance. The speech recognition unit 110 tries to match the detected speech signal with entries made in the speech recognition dictionary 108 and selects the entry that is the most likely to be what the caller is saying. The operation of the speech recognition units and the design of speech recognition dictionaries are well known in the art to which this invention pertains. For more information about speech recognition units and dictionaries, the reader is invited to consult the following patents and articles whose contents are hereby incorporated by reference.

U.S. Patents

| U.S. Pat. No. | INVENTOR |
| --- | --- |
| 5,488,652 | Gregory, J. Bislby et al. |
| 4,164,025 | Dubnowski et al. |
| 4,751,737 | Gerson et al. |
| 4,797,910 | Daudeiln |
| 4,959,855 | Daudeiln |
| 4,979,206 | Padden et al. |
| 5,050,215 | Nishimura |
| 5,052,038 | Shepard |
| 5,091,947 | Ariyoshi et al. |
| 5,097,509 | Lennig |
| 5,127,055 | Larkey |
| 5,163,083 | Dowden et al. |
| 5,181,237 | Dowden |
| 5,204,894 | Darden |
| 5,274,895 | Green |
| 5,307,444 | Tsuboka |
| 5,066,479 | Takanaga et al. |

OTHER ART

| TITLE | AUTHOR | SOURCE |
| --- | --- | --- |
| Dynamic Adaption of Hidden Markov Model for Robust Speech Recognition | | 1989, IEEE International Symposium on Circuits and Systems, vol.2, May 1989 pp.1338–1339 |
| Dynamic Modification of the Vocabulary of a Speech Recognition Machine | | IBM Technical Disclosure Bulletin, vol.27, No.7A, Dec. 1984 |
| Adaptive Acquisition of Language, | Gorin et al. | Computer Speech and Language, vol.5, No.2 Apr.1991, London, GB, pp. 101–132 |
| Automated Bilingual Directory Assistance Trial In Bell Canada | Lennig et al. | IEEE Workshop on Interactive Voice Technology for Telecom Applications, Piscataway, NJ. Oct.1992. |
| Unleashing The Potential of Human-To-Machine Communication | Labov and Lennig, | Telesis, Issue 97, 1993, pp.23–27 |
| An Introduction To Hidden Markov Models | Rabinar and Juang | IEEE ASSP Magazine, Jan. 1966, pp. 4–16 |
| Putting Speech Recognition to Work in The Telephone Network | Lennig, | Computer, published by IEEE Computer Society, vol.23, No.8, Aug. 1990 |
| Flexible Vocabulary Recognition of Speech Over The Telephone | Lennig et al. | IEEE Workshop on Interactive Voice Technology for Telecom Applications, Piscataway, NJ, Oct. 1992 |
| Mobile Robot Control by a Structural Hierarchical Neural Network | | Nagata et al. pp.69–76, 1989 |
| Large Vocabulary Continuous Speech Recognition: a Review | Steven Young | IEEE Automatic Speech Recognition Workshop, September 16, 1995 |
| Putting Speech Recognition to Work In the Telephone Network | Matthew Lennig | IEEE (August 1990) reprinted from Computer |

At some point, the user of the speech-processing unit 102 may want to expand the speech recognition dictionary such as to include new entries. In a voice activated dialing system, the new entry may be a new label with its associated telephone number. The training unit 104 performs the operation of adding a new entry to the speech recognition dictionary.

Figure 2:
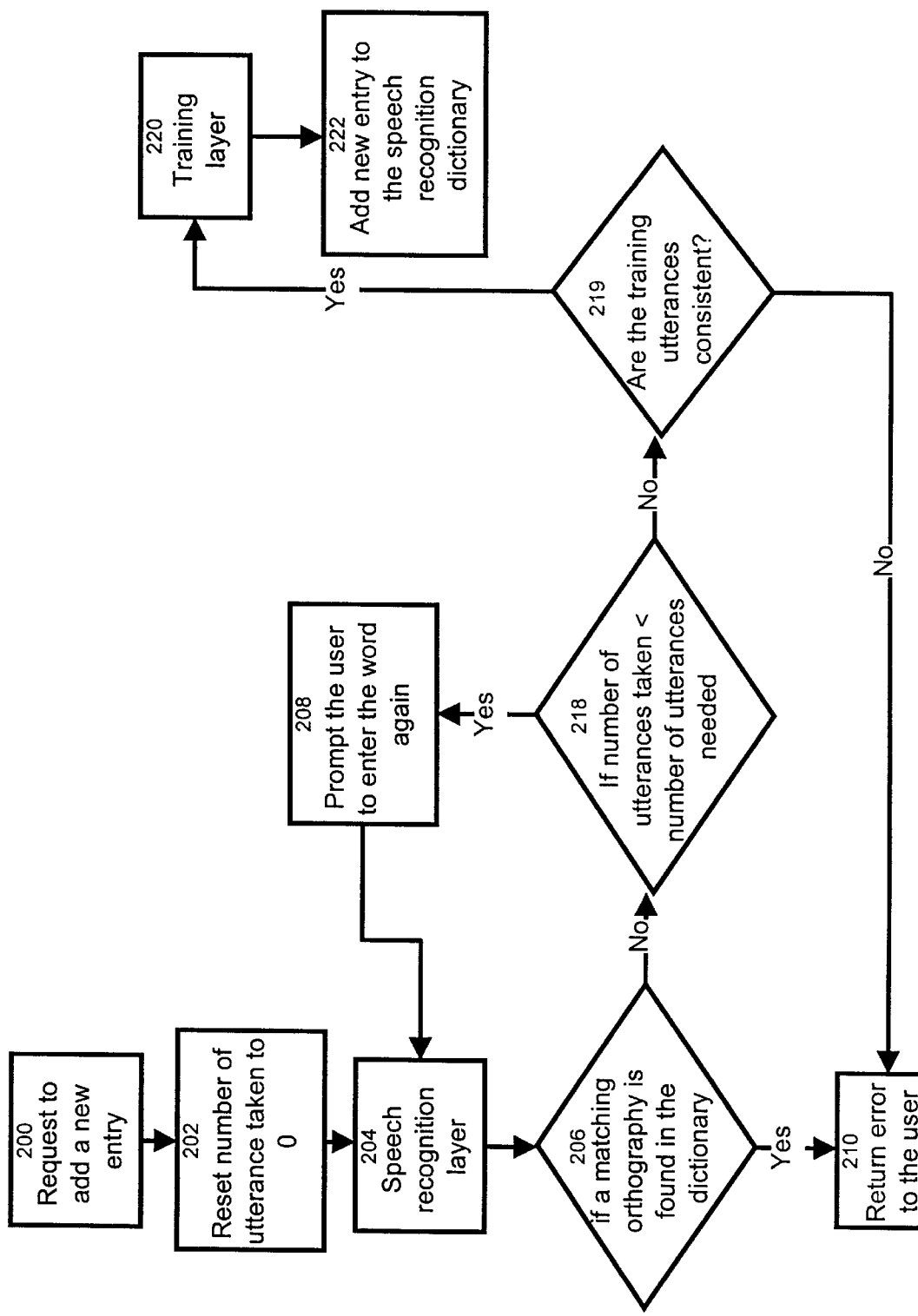
FIG. 2 shows a flow chart of a method in accordance with the invention for Creating an entry in a speech recognition dictionary.
Figure 3:
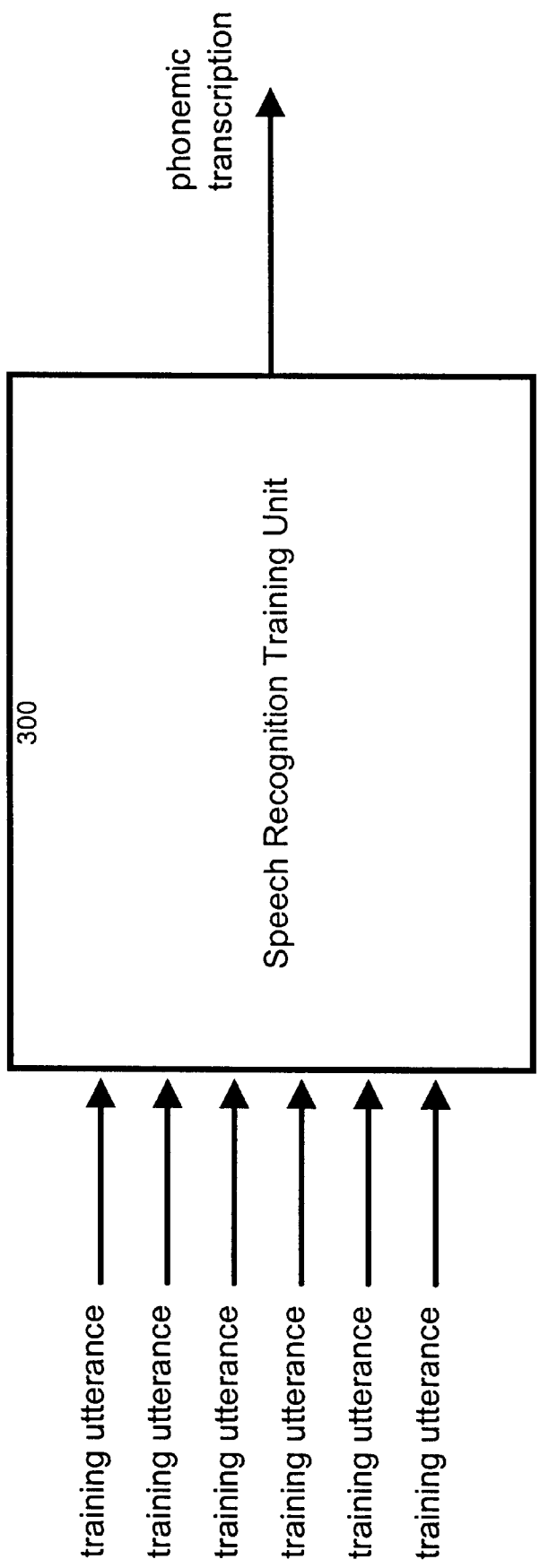
FIG. 3 shows a high level block diagram of a training unit in accordance with the present invention.

In a typical interaction, as shown in FIG. 2, once the voice-activated dialing system receives a request 200 from the user to add a new entry to the dictionary, the system will first issue a prompt over the telephone network requesting the user to utter the new entry. The number of utterances received for this new request is set to zero 202 indicating that no utterances have yet been entered for the new word. If valid speech is detected in response to this prompt, a speech recognition layer 204 is invoked that attempts to select from the speech recognition dictionary an entry that is most likely to match the spoken utterance. At condition 206, the system checks if a matching entry can be found in the speech recognition dictionary. In the affirmative, the system returns an error message 210 specifying that there already exists an entry in the dictionary corresponding to the utterance. If no entry in the speech recognition dictionary matches the utterance, the system proceeds to query 218 that verifies if a sufficient number of training utterances have been collected to define the new word. In the preferred embodiment the number of training utterances needed to create an entry in the dictionary for the new word is two (2). A larger number of training utterances may be used without departing from the spirit of the invention. Query 218 is answered in the positive if an insufficient number of utterances have been collected and the system prompts the user 208 to enter a new utterance of the same word and then proceeds to the speech recognition layer 204. If a sufficient number of utterances have been collected, condition 218 is answered in the negative and a consistency check 219 is performed in order to determine if the utterances entered are sufficiently similar to represent a same entry. Procedures to determine consistency, such as dynamic time warping (DTW), are well known in the art to which this invention pertains. Other methods may be used here to determine consistency without detracting from the spirit of the invention. If the utterances are not consistent, the system returns an error 210 to the user indicating that an invalid entry has taken place. If the utterances are consistent, a training layer 220 processes the utterances to generate a series of transcriptions. The training layer 220 is shown in block form in FIG. 3. Essentially a training unit 300 receives several utterances of the same word and produces transcriptions of these utterances. In the preferred embodiment, the transcriptions are a sequence of phonemes. Other acoustic sub-word units such as diphones, triphones may be used here to characterize a transcription without departing from the spirit of the invention.

When the training layer of the system is activated the process for the addition of the new entry to the speech recognition dictionary 222 begins. In the preferred embodiment a single entry (corresponding to at least one transcription) is stored in the speech recognition dictionary. A greater number of transcriptions may be stored in the dictionary without departing from the spirit of the invention. The training layer 220 may use a number of different approaches in generating the transcription that is then stored in the speech recognition dictionary.

The present inventors have made the unexpected discovery that by simultaneously decoding multiple training utterances and combining the results using certain heuristics, improved transcriptions of a new word can be obtained. The preferred embodiment of this invention makes use of one of three preferred approaches for the operation of the training layer namely the N-best approach, the forward-backward approach and the fast-matching approach. These approaches are described in detail in the sections that follow. Those strategies allow the creation of transcriptions that contain acoustic information originating from a plurality of utterances.

The N-best Approach

Figure 4A:
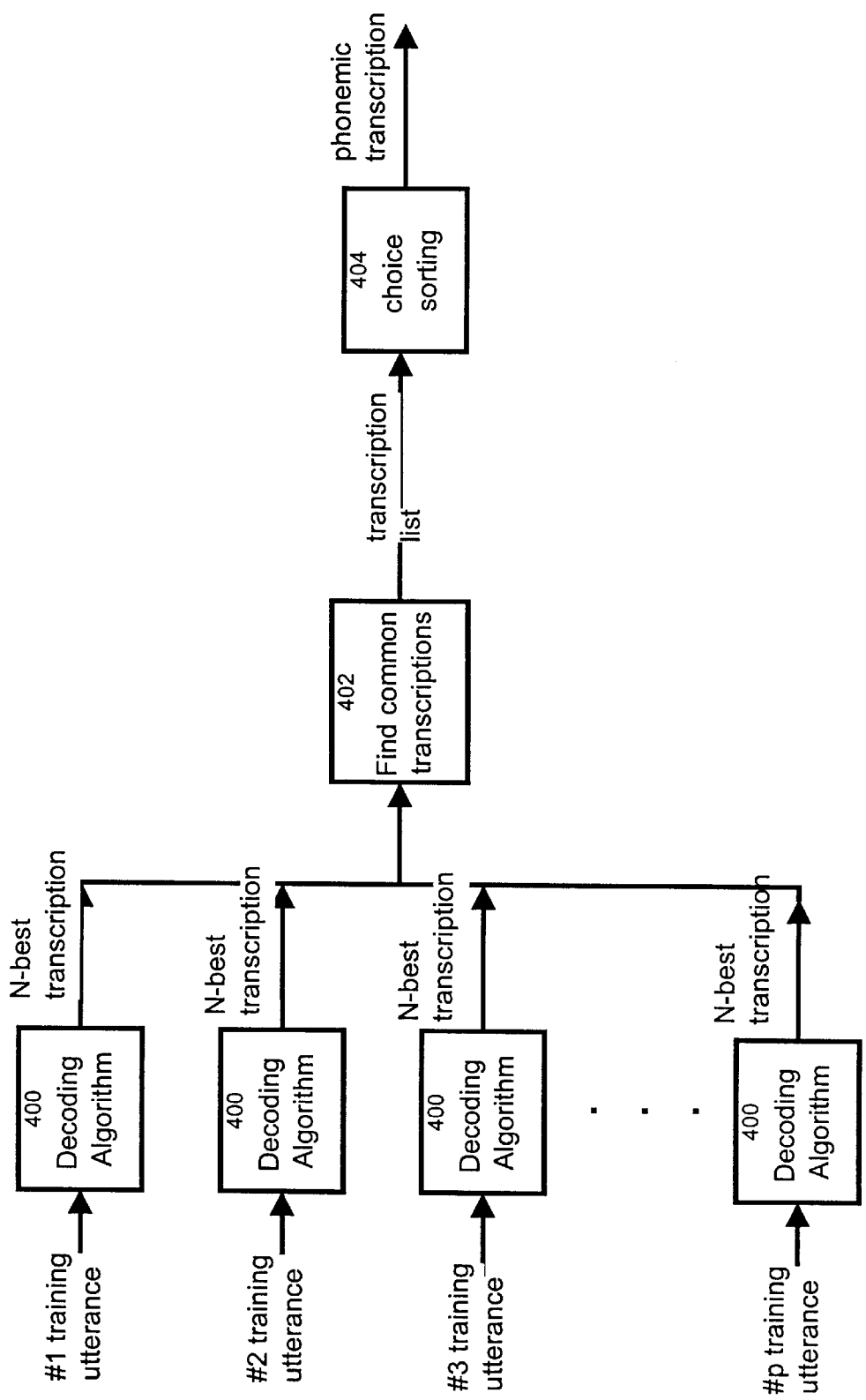
FIG. 4a shows a block diagram of a training unit using the N-best approach in accordance with a preferred embodiment of the invention.

The N-best approach is illustrated in FIG. 4a and essentially comprises three stages. During the first stage, a series of training utterances are processed by a series of functional blocks 400. Each one of these functional blocks implements a decoding algorithm using the maximum likelihood criterion that is applied on each training utterance separately. Here the objective is to create for each utterance a plurality of transcriptions that form a set of transcriptions. The transcriptions in each set differ from one another on a basis of the particular combination of acoustic sub-word units making-up the transcriptions. Each transcription is associated with a certain probabilistic score that establishes the likelihood of match of the transcription to the respective training utterance. In the preferred embodiment, Hidden Markov Models (HMMs) are used to represent the utterances and are scored according to a well-known method. Hidden Markov Models (HMMs) are well known in the art of speech recognition to which this invention pertains. As a reference, the reader is invited to consult L. Rabiner et al., Fundamentals of Speech Recognition, Prentice Hall, A. V. Oppenheim Editor, Englewood Cliffs, N.J. 1993, whose content is hereby incorporated by reference. In effect, each decoding algorithm block 400 scores all the possible transcriptions, herein designated as the set of all transcriptions T, and selects N transcriptions on the basis of high likelihood scores. The selected N transcriptions form a sub-set of the basic set T. In a specific example, for each training utterance, the value of N is 3 and the N best transcription candidates are determined based on probability likelihood computations. For example, if there are p utterances, then p×N transcriptions are selected. Mathematically, this operation can be expressed as follows:

$$T_i[k] = \underset{t \in T_i'[k]}{\mathrm{argmax}} P(t|Y_i) \qquad i = 1, \ldots, p \quad k = 1, \ldots N$$

$$T_i'[k] = \begin{cases} T & k = 1 \\ T - T_i[k-1] - T_i[k-2] \ldots - T_i[1] & k > 1 \end{cases}$$

Equation 3 where $T_1[k]$ is the transcription with the kth highest score for the ith utterance, p is the number of training utterances, $\{Y_1, Y_2, Y_3, \ldots Y_p\}$ are the training utterances, T is the set of all possible transcriptions, $T_i'[k]$ is the set of all possible transcriptions after the k−1 transcriptions with the highest scores have been removed, N is the number of transcriptions to be chosen from the set of all possible transcription T and P(|) designates a conditional probability computation. The result of this first stage is a sub-set of N candidate transcriptions, also designated in the specification as "N-best list", for each of the p training utterances.

Figure 4B:
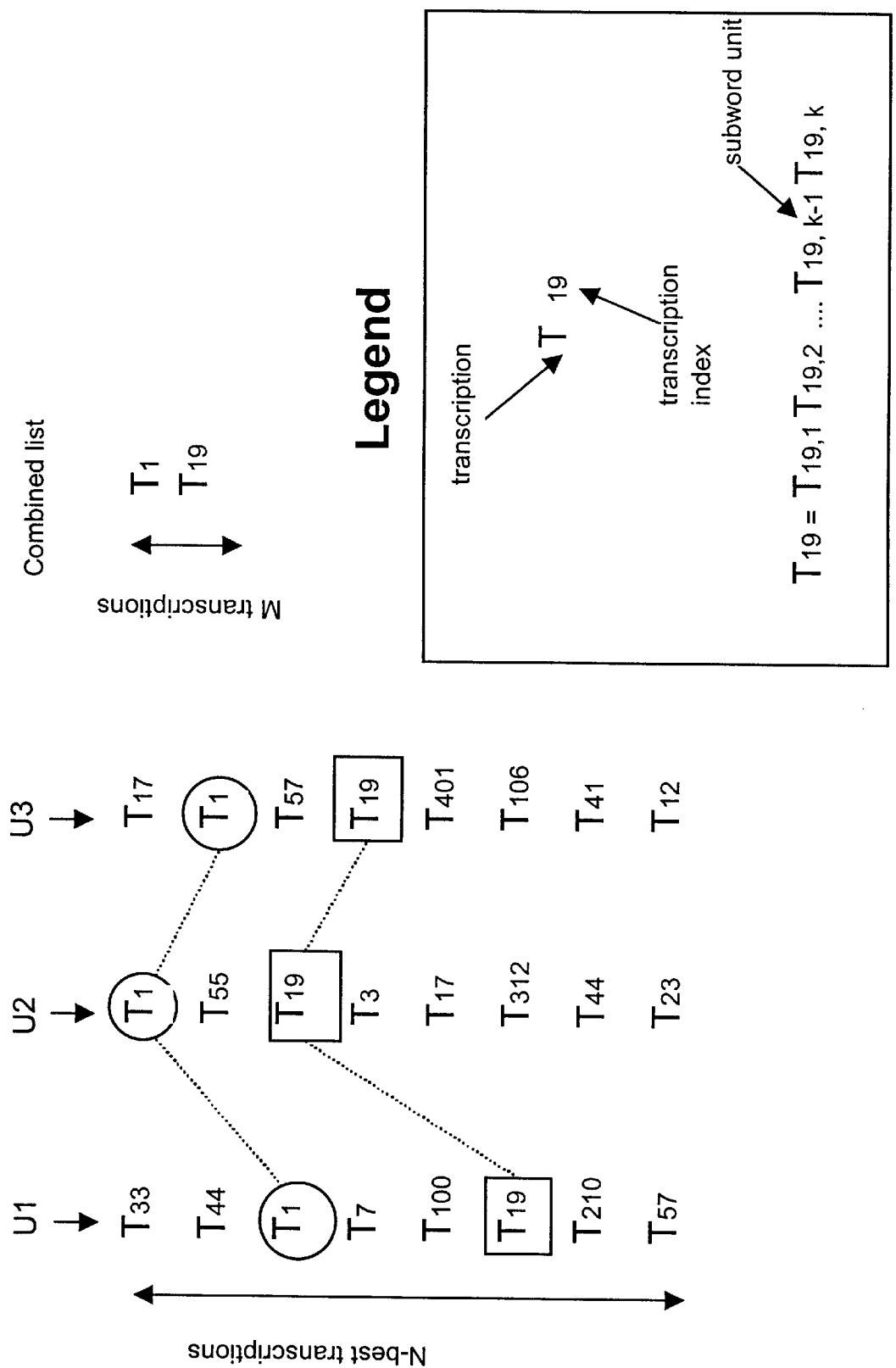
FIG. 4b shows an example of a process combining individual N-best transcription lists into a combined transcription list.

As a second stage 402, candidates that appeared in all the individual sub-sets are selected to form a combined list of size M. Preferably M is a non-zero integer equal or greater than one (1). An example for this process is illustrated in FIG. 4b. In this example there are three training utterances $\{U_1, U_2, U_3\}$ which have been processed by the decoding blocks 400 and which have each generated a sub-set of N transcription candidates. In this example N is eight (8) and the sub-sets are $U_1=\{T_{33}, T_{44}, T_1, T_7, T_{100}, T_{19}, T_{210}, T_{57}\}$, $U_2=\{(T_1, T_{55}, T_{19}, T_3, T_{17}, T_{312}, T_{44}, T_{23}\}$ and $U_3=\{T_{17}, T_1, T_{57}, T_{19}, T_{401}, T_{106}, T_{41}, T_{12}\}$. The sub-sets of the transcriptions are examined for those transcriptions that are present in every sub-set. Two common transcriptions exist, namely $\{T_1, T_{19}\}$. The combined list is therefore of size M=2 and includes these transcriptions are present in all sub-sets. If no candidate satisfies this criteria (M=0), namely if no common transcription can be found, then the size of each sub-set is increased by including in the sub-set transcriptions from the basic set that were previously excluded from the sub-set.

After the combined group (M transcriptions) has been determined, the scores of each individual transcriptions are then established. In the preferred embodiment, the score of each candidate in the combined list is set to the sum of the corresponding scores in the individual sub-sets. Thus, if a given transcription, has scores $P_1$, $P_2$ and $P_3$ where $P_1$ is the score for the transcription in the sub-set associated to the first utterance, $P_2$ is the score for the transcription in the sub-set associated to the second utterance and $P_3$ is the score for the transcription in the sub-set associated to the third utterance, then the score for that transcription in the combined list is $P_1+P_2+P_3$.

As a final stage 404, the combined candidate list of size M is sorted according to its candidate transcription scores. Sorting algorithms are well known in the art to which this invention pertains. The preferred embodiment of this invention uses the quick sort algorithm. The quick sort algorithm is well known in the field to which this invention pertains. Other sorting algorithms may be used here without departing form the spirit of the invention. The top L candidates of the sorted combined candidate list are then used as transcriptions for the new entry and stored in the speech recognition dictionary, where L is a predefined integer representing the number of transcriptions stored per word and where L≦M. For example, if only one transcription is desired for each new word, L is set to one (1).

The Forward-Backward Approach

Figure 5A:
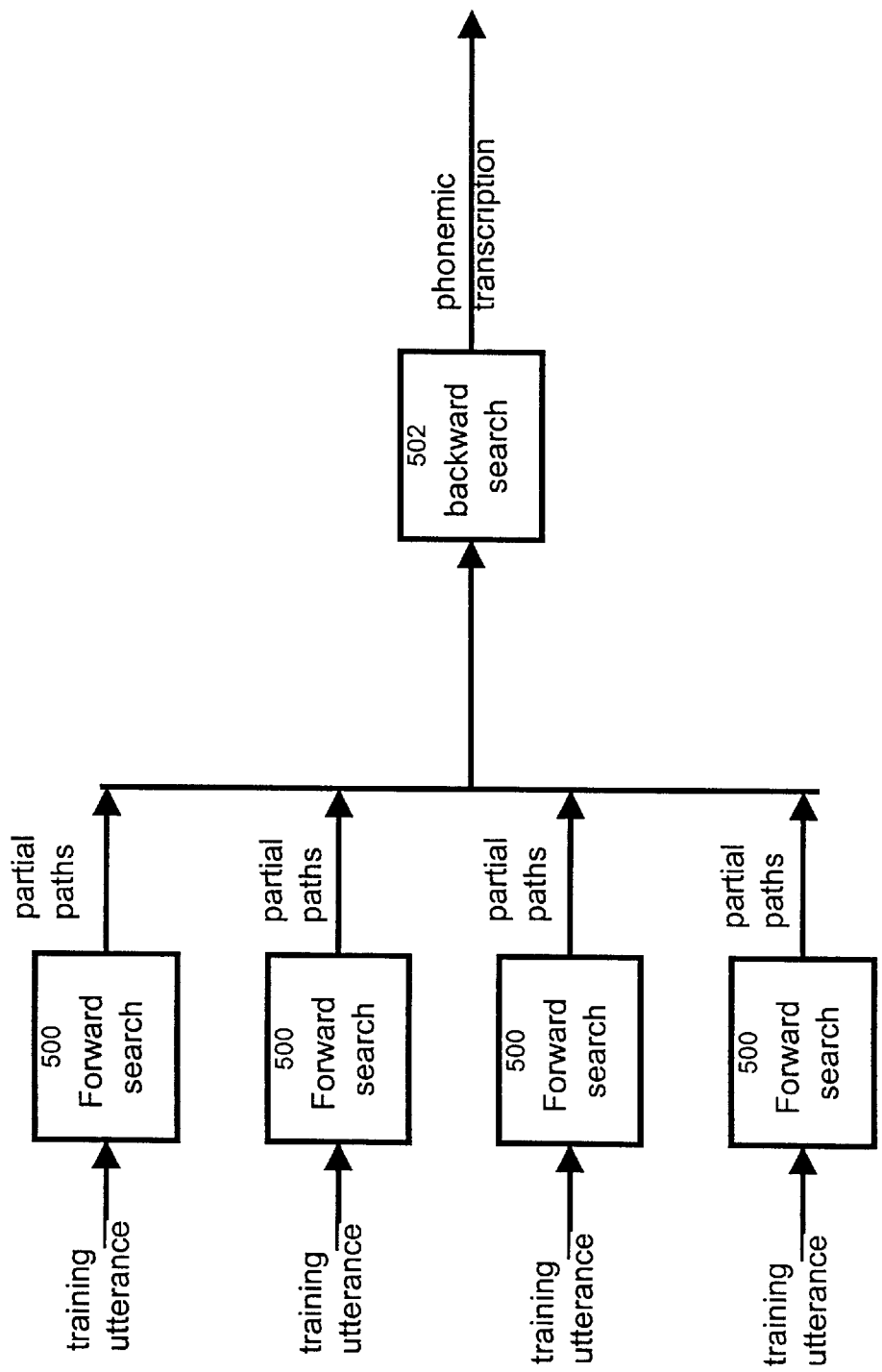
FIG. 5a shows a block diagram of a training unit using the forward-backward approach in accordance with another embodiment of the invention.

Another approach that call be used is a modified forward-backward approach. The traditional forward-backward is well known in the art to which this invention pertains. For more information, the reader in invited to refer to Rabiner et al. "Fundamentals of speech recognition", Prentice Hall, N.J., 1993 whose content is hereby incorporated by reference. The forward-backward approach used in this invention is illustrated in FIG. 5a and essentially comprises two stages. A series of training utterances are processed by a first series of functional blocks 500, herein designated as forward searching blocks. In the preferred embodiment, these blocks implement a forward searching algorithm such as the Viterbi search algorithm or the Level-Building search algorithm. These algorithms are well known in the art to which this invention pertains. Other suitable algorithms may be used here without departing from the spirit of the invention. At every frame t of the forward search, the optimum partial paths for each utterance are stored along with their associated probability likelihood value. For example, the values $F_w(t, Y_i)$, representing the forward maximum probabilities generated by the Viterbi search algorithm, are stored for the partial path having the highest score ending at time t with the phoneme label w for the training utterance $Y_i$. $F_w(t, Y_i)$ is computed from all time t and phoneme w in the forward pass for all training utterances $Y_i$. Essentially, the result of the forward search is a set of phonemic lattices, one lattice for each of the training utterances.

Figure 5B:
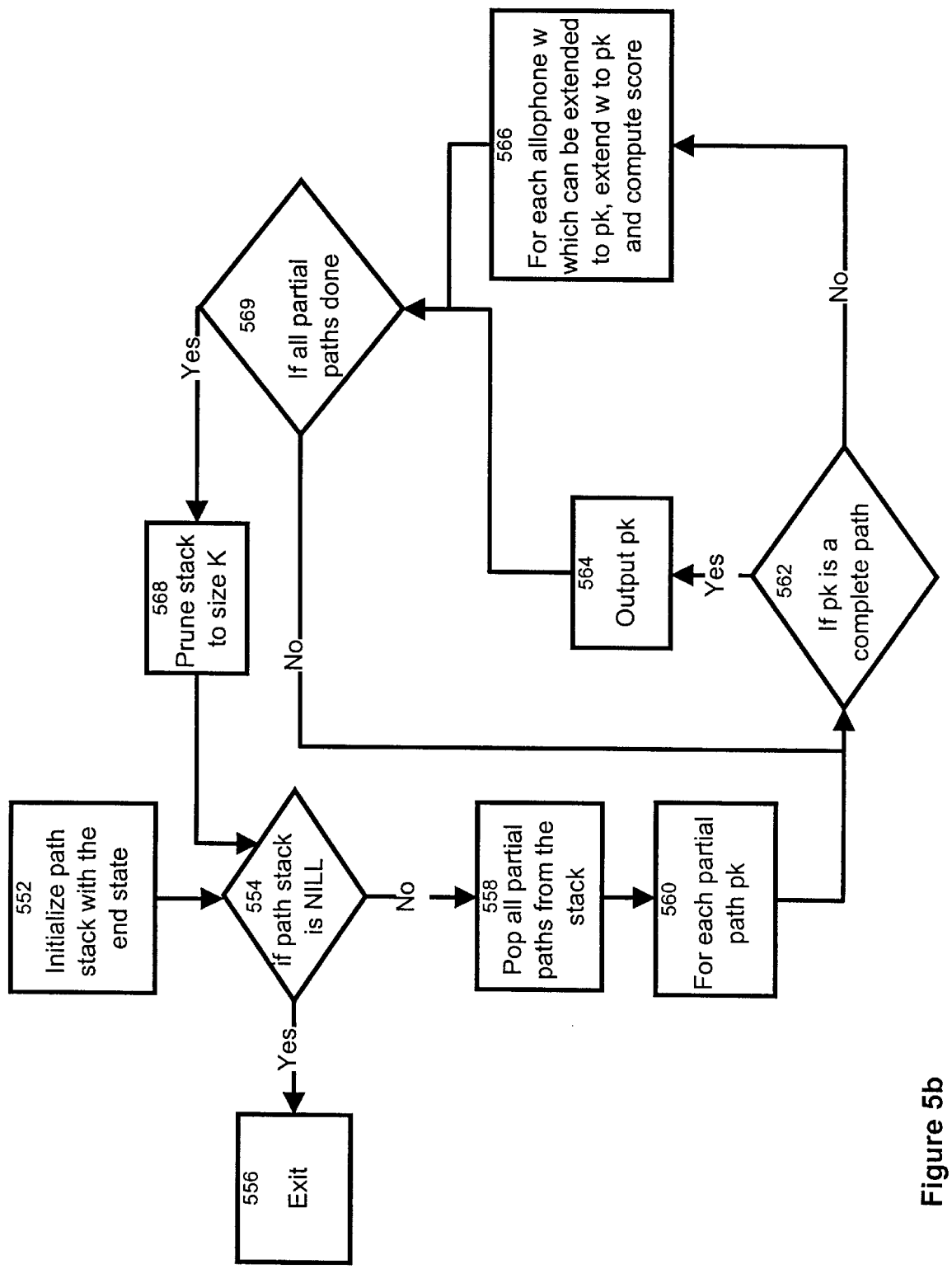

The second stage 502, herein designated as backward search stage, involves searching the lattices by using a backward search procedure, The preferred embodiment uses a modified version of the A* search algorithm. The A* algorithm is well-known in the art to which this invention pertains. The basic steps of this algorithm are shown in FIG. 5b. In the first step 552, a first-in last-out structure, herein designated as partial path stack, is initialized with an empty path containing the end state. At condition 554, the system verifies if the partial path stack is empty indicating that the end of the backward search has been reached. In the negative, all the partial paths are popped from the stack 558. Following this, for each partial path $p_k$ popped from the stack 560, condition 562 is evaluated to see if $p_k$ is a complete path. In the affirmative, $p_k$ is returned as a complete path 564 along with its probability likelihood score and stored in a list, herein designated as the candidate path list. If condition 562 is answered in the negative, each phoneme w that can be extended to $p_k$ is extended creating an extended partial path 566. The following scores are associated to the extended partial paths:

$$S_w = \sum_{i=1}^{n} \max_j \{F_w(t, Y_i) + B_p(t, Y_i)\} \quad \text{Equation 4}$$

where $S_w$ is the score associated to the phoneme w, n is the number of utterances, $Y_i$ is the ith utterance, $F_w(t,Y_i)$ is the forward maximum probabilities generated by the Viterbi search algorithm of the first stage from the beginning of utterance $Y_i$ up to time t and $B_p(t, Y_i)$ is the backward maximum probabilities of a particular partial path p covering speech frames from time t until the end of the utterance $Y_i$. This computation takes the results obtained from the forward stage for all the training utterances into account as shown in equation 4. Following steps 564 and 566, query 569 verifies if all partial path popped at step 558 have been dealt with. In the negative, the next partial part is processed beginning at condition 562. In the affirmative, the partial path stack is pruned 568 such that only the K top scoring partial paths are kept on for future processing. In the preferred embodiment of this invention the value of K is 3. Other sizes may be used without departing from the spirit of the invention. Following this, condition 554 is evaluated once again to see if the partial path stack is empty. In the negative, the system proceeds to step 558. If condition 554 is answered in the affirmative, the processing is complete and the backward search stage is completed. Once the backward search is completed, the top L scoring complete paths in the candidate path list are added into the speech recognition dictionary. For example, if only one transcription is desired for each new word, L is set to one (1).

The Fast-Matching Approach

Figure 6B:
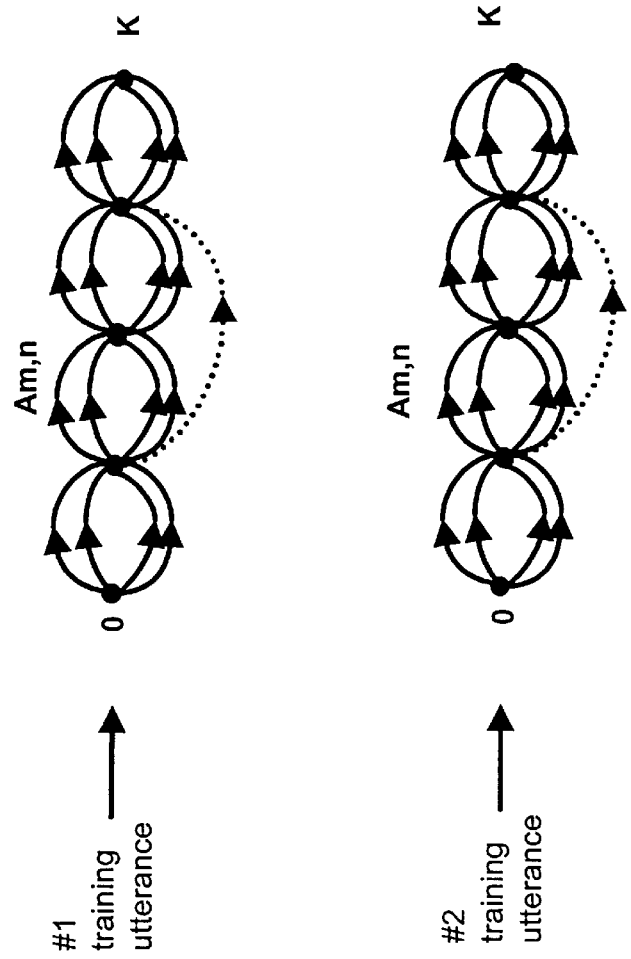
FIG. 6b shows word graphs corresponding to utterances used with the fast-matching approach embodiment of the invention.
Figure 6A:
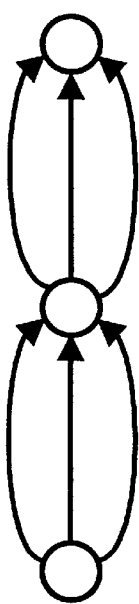
FIG. 6a shows a word graph with three nodes.

Yet another approach that can be used is the fast-matching approach. The fast-matching approach for adding a new word to a speech recognition dictionary is depicted in FIG. 7. As a first step 700, an approximate word graph is first generated for each training utterance. The concept of a graph is well known in the art to which this invention pertains. For more information about the fast match search with graphs, the reader is invited to consult V. N. Gupta et al. "Fast search strategy in a large vocabulary word recognizer", JASA 84(6), pp.2007–2017, December 1988 whose content is hereby incorporated by reference. Preferably each branch in the graph corresponds to one sub-word unit such as a phoneme. Each word graph is scored with a probability value associated to each branch. An example of a graph with three nodes is shown in FIG. 6a. As shown in the figure, the arrows are branches representing sub-word units and the circles are states. Preferably, the word graphs for all different utterances, as shown in FIG. 6b, have the same structure but different branch scores since the same phoneme grammar is used for decoding different utterances.

As a second step 702, the graphs are combined and scores of corresponding branches are summed in the unified graph. For example, the branch $B^{nm}_k$, where k is the index of the branch, in the transition from state $S_n$ to $S_m$ has scores $P^{k,nm}_1$, $P^{k,nm}_2$ and $P^{k,nm}_3$ for utterances $U_1$, $U_2$ and $U_3$ respectively. The score for the combined graph for the branch $B^{nm}_k$ is $P^{k,nm}_1 + P^{k,nm}_2 + P^{k,nm}_3$.

Following this, the unified graph is then processed to find the L-best scores 710, where L is the number of transcriptions desired for the new word, among all the branches in the unified graph. For example, if only one transcription is desired for each new word, L is set to one (1). Finding the L best scores in a graph is a process well known in the art and is discussed in detail in V. N. Gupta et al. "Fast search strategy in a large vocabulary word recognizer", JASA 84(6), pp.2007–2017, December 1988 whose content is herein incorporated by reference. In the preferred embodiment L is set to one. However, a greater number of transcriptions may be stored without departing from the spirit of the invention.

Alternatively, after the unified graph is created at step 702, it is processed to find the N-best scores 704 among all the branches in the unified graph. Following this, a detailed acoustic model re-scores 706 the candidates in the N-best list. In the preferred embodiment the Viterbi algorithm is used to re-score the N-best list. The L best scoring transcriptions are then identified 708 and added to the speech recognition dictionary, where L is the number of transcriptions stored for a new word and where L≦N. For example, if only one transcription is desired for each new word, L is set to one (1).

The above-described method for creating an entry in a speech recognition dictionary can be implemented on any suitable computing platform. Such computing platform typically includes a CPU and a memory connected to the CPU by a data communication bus. The memory stores the data and the instructions of the program implementing the functional blocks depicted in the drawings and described in the specification. That program operates on the data in accordance with the algorithms described above to generate the entry in the speech recognition dictionary based on a plurality of spoken training utterances of the same word.

Although the present invention has been described in considerable detail with reference to certain preferred embodiments thereof, variations and refinements are possible without departing from the spirit of the invention as have been described throughout the document. Therefore, the scope of the invention should be limited only by the appended claims and their equivalents.

I claim:

1. An apparatus for creating an entry associated with a certain word in a speech recognition dictionary, said apparatus comprising:
   an input for receiving audio information derived from at least two utterances of the certain word;
   processing means for processing said audio information to provide a certain transcription of the certain word, said certain transcription being derived from acoustic information contained in each one of said two utterances, said processing means including:
   a) means for generating a plurality of transcriptions for each utterance, the transcriptions associated with each utterance forming a set of transcriptions;
   b) means for searching the sets of transcriptions for at least one transcription common to the sets of transcriptions;
   c) means for creating a subset of transcriptions on the basis of said at least one transcription common to the sets of transcriptions;
   d) means for selecting said certain transcription from said subset of transcriptions;
   means for creating an entry in the speech recognition dictionary on a basis of said certain transcription.

2. The apparatus as defined in claim 1, wherein said processing means includes means for computing a score for each common transcription.

3. The apparatus as defined in claim 2, wherein said processing means computes a score for each transcription in a given set of transcriptions.

4. The apparatus as defined in claim 3, wherein each score for a common transcription is computed at least in part on the basis of scores of the transcriptions in respective sets of transcriptions.

5. The apparatus as defined in claim 4, wherein the score for a transcription in the subset of transcriptions is the sum of the scores of the transcription in respective sets of transcriptions.

6. The apparatus as defined in claim 5, wherein said processing means includes means for classifying the common transcriptions on a basis of the scores of the common transcriptions.

7. An apparatus for creating an entry associated with a certain word in a speech recognition dictionary, said apparatus comprising:
   an input for receiving audio information derived from at least two utterances of the certain word;
   processing means for processing said audio information to provide a certain transcription of the certain word, said certain transcription being derived from acoustic information contained in each one of said two utterances, said processing means including:
   a) means for establishing a compound scoring data structure established on the basis of acoustic characteristics from each of said at least two utterances;
   b) means for searching the compound scoring data structure to generate the certain transcription;
   means for creating an entry in the speech recognition dictionary on a basis of said certain transcription.

8. An apparatus as defined in claim 7, wherein said processing means includes means for establishing for each utterance a phonemic lattice, said compound scoring data structure being derived at least in part from the phonemic lattice.

9. An apparatus as defined in claim 8, wherein said processing means includes means for merging the phonemic lattices of several utterances together to obtain a merged phonemic lattice, said merged phonemic lattice defining said compound scoring data structure.

10. An apparatus as defined in claim 9, wherein said processing means includes means for searching the merged phonemic lattice to select the certain transcription.

11. An apparatus as defined in claim 7, wherein said processing means includes means to establish a graph for each utterance, said compound scoring data structure being derived at least in part from the graph.

12. An apparatus as defined in claim 11, wherein said processing means includes means for merging the graphs of several utterances together to obtain a merged graph, said merged graph defining said compound scoring data structure.

13. An apparatus as defined in claim 12, wherein said processing means includes means for searching the merged graph for a certain probability path and selecting a transcription corresponding to said certain probability path as the certain transcription on the basis of which the entry in the speech recognition dictionary is created.

14. An apparatus as defined in claim 13, wherein said certain probability path is the highest probability path.

15. A method for creating an entry associated with a certain word in a speech recognition dictionary, said method comprising the steps of:
   receiving audio information derived from at least two utterances of the certain word;
   processing said audio information to provide a certain transcription of the certain word, said certain transcription being derived from acoustic information contained in each one of said two utterances, said processing step including the steps of:
   a) generating a plurality of transcriptions for each utterance, the transcriptions associated with each utterance forming a set of transcriptions;
   b) searching the sets of transcriptions for at least one transcription common to the sets of transcriptions;
   c) creating a subset of transcriptions on the basis of said at least one transcription common to the sets of transcriptions;
   d) selecting said certain transcription from said subset of transcriptions;
   creating an entry in the speech recognition dictionary on a basis of said certain transcription.

16. The method as defined in claim 15, comprising the step of computing a score for each common transcription.

17. The method as defined in claim 16, comprising the step of computing a score for each transcription in a given set of transcriptions.

18. The method as defined in claim 17, wherein each score for a common transcription is computed at least in part on the basis of scores of the transcriptions in respective sets of transcriptions.

19. The method as defined in claim 18, wherein the score for a common transcription is the sum of the scores of the transcription in respective sets of transcriptions.

20. The method as defined in claim 19, comprising the step of classifying the common transcriptions on a basis of the scores of the common transcriptions.

21. A method for creating an entry associated with a certain word in a speech recognition dictionary, said method comprising the steps of:
    receiving audio information derived from at least two utterances of the certain word;
    processing said audio information to provide a certain transcription of the certain word, said certain transcription being derived from acoustic information contained in each one of said two utterances, said processing step including the steps of:
        a) establishing a compound scoring data structure established on the basis of acoustic characteristics from each of said at least two utterances;
        b) searching the compound scoring data structure to generate the certain transcription;
    creating an entry in the speech recognition dictionary on a basis of said certain transcription.

22. The method as defined in claim 21, comprising the step of establishing for each utterance a phonemic lattice, said compound scoring data structure being derived at least in part from the phonemic lattice.

23. The method as defined in claim 22, comprising the step of merging the phonemic lattices of several utterances together to form a merged phonemic lattice, said merged phonemic lattice defining said compound scoring data structure.

24. The method as defined in claim 23, comprising the step of searching the merged phonemic lattice to generate a transcription representative of said at least two utterances.

25. The method as defined in claim 21, comprising the step of establishing a graph for each utterance, said compound scoring data structure being derived at least in part from the graph.

26. The method as defined in claim 25, comprising the step of merging the graphs of several utterances together to form a merged graph, said merged graph defining said compound scoring data structure.

27. The method as defined in claim 26, comprising the step of searching the merged graph for a certain probability path and selecting a transcription corresponding to said certain probability path as the certain transcription on the basis of which the entry in the speech recognition dictionary is created.

28. The method as defined in claim 27, wherein said certain probability path is the highest probability path.

29. A machine-readable storage medium containing a program element to direct a computer to create an entry associated with a certain word in a speech recognition dictionary, said program element implementing functional blocks, comprising:
    an input for receiving audio information derived from at least two utterances of the certain word;
    processing means for processing said audio information to provide a certain transcription of the certain word, said certain transcription being derived from acoustic information contained in each one of said two utterances, said processing means including:
        a) means for generating a plurality of transcriptions for each utterance, the transcriptions associated with each utterance forming a set of transcriptions;
        b) means for searching the sets of transcriptions for at least one transcription common to the sets of transcriptions;
        c) means for creating a subset of transcriptions on the basis of said at least one transcription common to the sets of transcriptions;
        d) means for selecting said certain transcription from said subset of transcriptions;
    means for creating an entry in the speech recognition dictionary on a basis of said certain transcription.

30. The machine-readable storage medium as defined in claim 29, wherein said processing means includes means for computing a score for each common transcription.

31. The machine-readable storage medium as defined in claim 30, wherein said processing means computes a score for each transcription in a given set of transcriptions.

32. The machine-readable storage medium as defined in claim 31, wherein each score for a common transcription is computed at least in part on the basis of scores of the transcriptions in respective sets of transcriptions.

33. The machine-readable storage medium as defined in claim 32, wherein the score for a common transcription is the sum of the scores of the transcription in respective sets of transcriptions.

34. The machine-readable storage medium as defined in claim 33 wherein said processing means includes means for classifying the common transcriptions on a basis of the scores of the common transcriptions.

35. A machine-readable storage medium containing a program element to direct a computer to create an entry associated with a certain word in a speech recognition dictionary, said program element implementing functional blocks, comprising:
    an input for receiving audio information derived from at least two utterances of the certain word;
    processing means for processing said audio information to provide a certain transcription of the certain word, said certain transcription being derived from acoustic information contained in each one of said two utterances, said processing means including:
        a) means for establishing a compound scoring data structure established on the basis of acoustic characteristics from each of said at least two utterances;
        b) means for searching the compound scoring data structure to generate the certain transcription;
    means for creating an entry in the speech recognition dictionary on a basis of said certain transcription.

36. The machine-readable storage medium as defined in claim 35, wherein said processing means includes means for establishing for each utterance a phonemic lattice, said compound scoring data structure being derived at least in part from the phonemic lattice.

37. The machine-readable storage medium as defined in claim 36, wherein said processing means includes means for merging the phonemic lattices of several utterances together to form a merged phonemic lattice, said merged phonemic lattice defining said compound scoring data structure.

38. The machine-readable storage medium as defined in claim 37, wherein said processing means includes means for searching the merged phonemic lattice to generate a transcription representative of said at least two utterances.

39. The machine-readable storage medium as defined in claim 35, wherein said processing means includes means to establish a graph for each utterance, said compound scoring data structure being derived at least in part from the graph.

40. The machine-readable storage medium as defined in claim 39, wherein said processing means includes means for merging the graphs of several utterances together to form a merged graph, said merged graph defining said compound scoring data structure.

41. The machine-readable storage medium as defined in claim 40, wherein said processing means includes means for searching the merged graph for a certain probability path and selecting a transcription corresponding to said certain probability path as the certain transcription on the basis of which the entry in the speech recognition dictionary is created.

42. The machine-readable storage medium as defined in claim 41, wherein said certain probability path is the highest probability path.

\* \* \* \* \*

UNITED STATES PATENT AND TRADEMARK OFFICE
CERTIFICATE OF CORRECTION

PATENT NO. : 5,983,177

DATED : November 9, 1999

INVENTOR(S) : Jianxiong WU et al.

Page 1 of 2

It is certified that error appears in the above-identified patent and that said Letters Patent is hereby corrected as shown below:

Column 1, line 9, change « all » to --an--
Column 2, Equation 2, after « (Yi|t » insert -- ) --
Column 2, Equation 2, change « ))» to « ) »
Column 2, line 51, after the word « reference » insert -- . --
Column 3, line 19, change « expressions » to --expression--
Column 4, line 64, change « frame < » to --frame t--
Column 5, line 39, change « ir » to --in--
Column 6, line 32, change « Creating » to --creating--
Column 7, Inventor column, line 31, change « Bislby » to --Bielby--
Column 7, Inventor column, line 33, change « Daudeiln » to --Daudelin--
Column 7, Inventor column, line 34, change « Daudeiln » to --Daudelin--
Column 7, Inventor column, line 44, change « Takanaga » to --Takenaga--
Column 7, U.S. Pat. No. column, line 42, change « 5,274,895 » to --5,274,695--
Column 7, U.S. Pat. No. column, line 44, change « 5,066,479 » to --5, 086,479--
Column 7, Source column, line 51, change « pp.1338 » to --pp. 1336--

UNITED STATES PATENT AND TRADEMARK OFFICE
CERTIFICATE OF CORRECTION

PATENT NO. : 5,983,177

DATED : November 9, 1999

Page 2 of 2

INVENTOR(S) : Jianxiong WU et al.

It is certified that error appears in the above-identified patent and that said Letters Patent is hereby corrected as shown below:

Column 7, Source column, line 65, change « 1966 » to
--1986--
Column 10, line 65, change « call » to --can--
Column 12, line 35, before « $K_{nm_2}$ » insert --P--

Signed and Sealed this

Seventh Day of November, 2000

Attest:

Q. TODD DICKINSON

*Attesting Officer*  *Director of Patents and Trademarks*